3,714,366
METHOD FOR THE PRODUCTION OF MORDENITE

Yasuhiko Fukuda, Ichikawa-shi, and Noboru Yuyuma, Matsudo-shi, Japan, assignors to Nippon Chemical Industrial Co., Ltd., Tokyo, Japan
No Drawing. Filed Sept. 10, 1969, Ser. No. 856,842
Claims priority, application Japan, Sept. 10, 1968, 43/64,628
Int. Cl. C01b 33/28
U.S. Cl. 423—329    1 Claim

ABSTRACT OF THE DISCLOSURE

Crystalline zeolites including mordenite and analcite are produced by heating an alkali metal silicate glass comprising $SiO_2$, $M_2O$, and $Al_2O_3$ wherein M is sodium or potassium, the molar ratio of $SiO_2/M_2O$ ranging from about 1 to 4 and the $Al_2O_3$ being present in an amount up to 10% by weight (preferably 0.1–5%) based on the weight of $SiO_2$ and $M_2O$, in water at a temperature of from about 110 to 210° C. until the zeolite product forms. Auxiliary raw materials such as powdered silica sand, silica sol, silica gel, diatomaceous earth, sodium or potassium hydroxides or carbonates, sodium aluminate, aluminum hydroxide, and alumina sol can be used with the alkali metal silicate glass.

BACKGROUND OF THE INVENTION (1) Field of the invention

The present invention relates to a method for the production of zeolites. More specifically, the present invention is concerned with the production of analcite and mordenite.

(2) Description of the prior art

Mordenite has recently been successfully developed for use in various fields, e.g., as a gas-drying agent, as a selective absorbent for gas mixtures, e.g., a molecular sieve, and as a catalyst.

Hithertofore, one of the processes for the production of analcite or mordenite is the method of R. M. Barrer. According to the method of Barrer, synthetic zeolites and other similar minerals have been prepared using as a starting material, an alumino silicate gel composed of

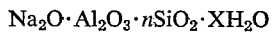

$$Na_2O \cdot Al_2O_3 \cdot nSiO_2 \cdot XH_2O$$

where $n$ ranges from 1 to 12, at a temperature of from 150 to 450° C., and in the presence of water (J. Chem. Soc., 1561 (1952)).

Also, a method of making crystalline mordenite from an aqueous solution of sodium aluminate and aqueous silica sol is disclosed in Japanese published Pat. No. 17,854/66.

Other methods are known, but these hitherto known methods have various disadvantages as industrial processes due to the preparation of the raw material needed, the operating conditions required, and the necessity of using high-pressure equipment.

SUMMARY OF THE INVENTION

The present invention relates to a method for the production of crystalline analcite or mordenite, or mixtures thereof. The present invention provides a method of making zeolite which comprises: (a) treating, at a temperature of from about 110 to 210° C. in the presence of water, a solid alkali metal silicate glass comprising $SiO_2$, $M_2O$ and $Al_2O_3$ wherein M is sodium or potassium, the molar ratio $SiO_2/M_2O$ ranges from about 1 to 4 and the $Al_2O_3$ is present in said glass in an amount of 10% by weight, or less (preferably 0.1 to 5% by weight), based on the weight of the $SiO_2$ and $M_2O$, or a mixture of said solid alkali metal silicate glass with an auxiliary raw material selected from the group consisting of a silicic acid material, an alkaline material, an aluminum compound and mixtures thereof, wherein when said auxiliary raw material is used, the molar ratio $SiO_2/M_2O$ ranges from about 1 to 6 and the $Al_2O_3$ is present in said glass in an amount of from about 0.1 to 10% by weight, based on the weight of the $SiO_2$ and $M_2O$; (b) separating a solid matter obtained from the reaction mixture; and (c) purifying said solid matter. A further object is to provide a method for making water glass which comprises separating a liquid matter from said reaction mixture.

The alkali metal silicate glass used as the starting material in this invention has the above described composition. One containing $Al_2O_3$ in silica sand or other silicic acids can be used to produce a glass for use in this invention. It may also be possible to prepare a suitable glass, where desired, by adding the aluminum compound to the glass.

In the practice of the present invention, the presence of more than about 10% by weight of $Al_2O_3$ in the alkali metal silicate glass makes the production of zeolite difficult and unpractical as an industrial process. Because of the solubility of the alkali metal silicate glass, it is possible to produce good zeolite. The addition of the following compounds as the auxiliary raw materials to be used with the alkali metal silicate glass procedure good results. Suitable examples of these auxiliary raw materials include silicic acids such as finely powdered silica sand, silica sol, silica gel, silicic clay and diatomaceous earth, alkaline compounds such as the sodium or potassium hydroxides or carbonates, and aluminum compound such as sodium aluminate, aluminum hydroxide, alumina sol, and mineral aluminum hydroxide. Where desired, they can be used with the alkali metal silicate glass as a part of the starting material. Mixtures of the above auxiliary raw materials can also be used.

Accordingly, the following embodiments set forth more specifically the preparation and composition of the starting materials suitable for use in the process of this invention, e.g., a starting material comprising, (a) Alkali metal silicate glass;
(b) Alkali metal silicate glass and an aluminum compound;
(c) Alkali metal silicate glass and an alkaline compound;
(d) Alkali metal silicate glass, an aluminum compound and an alkaline compound;
(e) Alkali metal silicate glass and a silicic acid material;
(f) Alkali metal silicate glass, an aluminum compound, an alkaline compound and a silicic acid material.

The alkali metal silicate glass comprises a molar ratio of $SiO_2$ to $M_2O$ of from 1 to 4, wherein M represents sodium or potassium, and contains 10% or less by weight, preferably about 0.1 to 5% by weight, of $Al_2O_3$.

It is to be understood that the starting materials used in this process are not limited to the above described embodiments. They are merely exemplary. For example, it is possible to use either a solid or liquid alkaline compound or aluminum compound. Additionally, any order of mixing of the materials can be used.

In the alkali metal silicate glass starting material, it is necessary that the molar ratio $SiO_2/M_2O$ ranges from about 1 to 4 and that the $Al_2O_3$ be present in an amount of from about 0.1 to 10% by weight, based on the weight of $SiO_2$ and $M_2O$. If the weight percent of $Al_2O_3$ is less than about 0.1, the solubility in the mother liquor is such that zeolite is never formed.

Accordingly, the glass to be used in this invention is composed of not only two ingredients of $M_2O$-$SiO_2$ but three ingredients $M_2O$-$SiO_2$-$Al_2O_3$, wherein M is preferably sodium. By using said glass as an indispensible starting raw material each ingredient can be introduced uniformly into the reaction system by dissolving the alkali metal silicate glass and increasing gradually and uniformly the concentration of each ingredient. With this procedure a good crystalline nucleus of zeolite is formed.

The most ideal condition for the formation of crystalline zeolite can be achieved by the use of an alkali metal silicate glass. A crystal grown from said glass becomes a seed even when a non-uniform auxiliary raw material is present. As a result, good crystals of zeolite can be developed. Where the auxiliary raw materials, described above, are used, the amount of alkali metal silicate glass necessary can be varied in accordance with types of zeolite to be produced, the raw material used, and the conditions of formation of the zeolite. However, it is necessary that the amount of $SiO_2$ in the alkali metal silicate glass is greater than about 10% by weight based on any $SiO_2$ in the auxiliary raw material.

By the process of the present invention, the production of good mordenite can be realized by the use of a solid alkali metal silicate glass comprising $SiO_2$, $M_2O$ and $Al_2O_3$ wherein the molar ratio $SiO_2/M_2O$ ranges from about 2.5 to 4 and the amount of $Al_2O_3$ ranges from about 0.5 to 5% by weight, based on the amount of $SiO_2$ and $M_2O$. Good zeolite can be prepared by using said glass together with the other raw materials; where these raw materials are used, the molar ratio of $SiO_2$ to $M_2O$ in the composition ranges from about 2.5 to 6 and the $Al_2O_3$ is present at about 0.5 to 10% by weight based on total amount of $SiO_2$ and $M_2O$.

The process of this invention utilizes the above described compositions in the presence of a suitable amount of water in a high pressure reactor. The amount of water to be added is based on the concentration of the alkali metal silicate, i.e., alkali concentration in the $SiO_2$ and $M_2O$. It is usually more than about 50% by weight based on the total amount of $SiO_2$ and $M_2O$. The reaction conditions can be varied in accordance with the properties of the raw materials used, the composition of the starting material and the processing scale, size, and the like. The process can be successfully used by heating the reaction system to approximately 110° C. to 210° C., preferably from 130° C. to 190° C. The processing time is greater than 0.5 hour at these temperatures, however, this is not limiting. The process generally will be substantially complete within 10 hours depending on the operating conditions and other factors. Under these conditions, the raw materials are dissolved due to the action of the water and the temperature, and form a viscous solution containing an alkali metal silicate at a molar ratio of $SiO_2/M_2O$ of from about 1 to 4 and solid zeolite.

With sufficient aging, two layers consisting respectively of a transparent alkali metal silicate solution and zeolite are obtained and by separating the layers by filtration with the zeolite and the alkali metal silicate being obtained.

The zeolite formed is generally mordenite when the molar ratio $SiO_2/M_2O$ of the alkali metal silicate solution composition is greater than about 3, while analcite generally is formed when molar ratio is less than about 3. Therefore, a selective production of mordenite or analcite, or mixtures of them can be obtained by varying appropriately the molar ratio of $SiO_2/M_2O$ in the alkali silicate solution. An alkali metal silicate having a molar ratio of from 1 to 4 can be obtained as a water glass by-product.

Since an alkali metal silicate and the other impurities are present in the zeolite, obtained as above, use of the zeolite, as a molecular sieve, a catalyst and a drying agent may necessitate purification. The zeolite washed with only a small amount of water for the purpose of recovering the alkali silicate adhered on the zeolite results in a zeolite not suitable for the above described uses. It is, thus, essential to purify the crude zeolite by means of a washing process. Purification of the crude zeolite is usually carried out using water heated above room temperature. The crude zeolite can also be purified by washing the product with mineral acids such as hydrochloric acid, sulfuric acid, nitric acid, phosphoric acid and the like, and organic acids such as formic acid, acetic acid, oxalic acid and the like. Cation exchange resins can also be used and are preferred.

A number of purifying procedures can be used, for example, the crude zeolite is charged to a column and then washed with water and acid passed through said column, or the crude zeolite is washed with water or acid passed through a cation exchange resin. Combinations of these procedures can also be used where the zeolite is washed with water, the washings may be recycled.

Purification by washing with water is generally sufficient to remove impurities adhered to the zeolite, however, washing with acid and with water after the first water washing may be advantageous. However, after washing initially with an acid, water-washing can be used, but easy formation of silica gel is caused, thereby making the washing operation more difficult. After washing first with water, an acid treatment is preferred. The concentration of the acid used is not critical and it may, of course, be conducted above room temperature.

Washing with only water results in the use of a large amount of water and a long treating time. Therefore, in view of this, it is desirable to combine water-washing with an acid treatment. Purifications of the crude zeolite can also be based on contact with an H-type cation exchange resin in the presence of water with stirring after water-washing or acid-washing, where necessary. Separation is accomplished using the different particle sizes, and a water or acid-circulating system comprising two or more connecting columns, e.g., a column charged with the crude zeolite and the other column charged with the cation exchange resin through a connection equipped with a quantitative pump and the like. Good results are obtained with mordenite by washing the mordenite with acid according to the above. After the purification, the zeolite is subjected to drying or to high temperature treatment.

Synthesis of zeolite according to the invention described herein has the advantages of the use of a lower temperature and a shorter treating time as compared with known methods, and furthermore the advantage of producing simultaneously an alkali metal silicate in the process. On the other hand, the purified zeolite (especially mordenite) is stable to a high temperature and possesses strong catalytic activity.

The following examples set forth more specifically the present invention without limiting the invention to the embodiments set forth in the examples.

EXAMPLE I

A sodium silicate glass (800 parts) containing 0.9 weight percent $Al_2O_3$ and having a $SiO_2/Na_2O$ molar ratio of 2.1 and water (1000 parts) were charged into an autoclave. The contents were heated to 158° C. at an increased pressure for about 5 hours. The reaction solution from the autoclave was then filtered off to separate the solid matter.

X-ray diffraction on the solid matter confirmed the solid matter to be analcite. The analcite was placed in a column, washed with hot water (70° C.) to remove any impurities and dried to obtain about 20 parts of pure analcite.

EXAMPLE II

The sodium silicate glass as used in Example I (700 parts) sodium aluminate (50 parts; 25% $Al_2O_3$) and water (900 parts) were heated at 158° C. for about 5 hours in a horizontal rotary autoclave. Solid matter was separated successively from the reaction solution. The solid matter was washed with water at 60° C. with aqueous 4 N HCl, with water, and then dried. The purified material gave 70 parts of analcite.

EXAMPLE III

A sodium silicate glass (800 parts) containing 1.0 weight percent of $Al_2O_3$ and having a $SiO_2$ to $Na_2O$ molar ratio of 3.3 and water (1300 parts) were charged into a horizontal rotary autoclave. The contents were heated at 170° C. for about 6 hours. Solid matter, successively taken from the autoclave, was washed with water at about 50° C., soaked in aqueous 6 N HCl, washed sufficiently with water, and then dried. The purified material was about 40 parts of mordenite. The mordenite was very stable to a high temperature of 700° C. for 3 hours.

EXAMPLE IV

The sodium silicate glass used in Example III (300 parts), the sodium aluminate used in Example II (20 parts), and water (480 parts) were charged to a horizontal rotary autoclave, and allowed to react under the same conditions of Example III. Solid matter, successively obtained from the autoclave, was charged to a column, washed with water at 80° C. to remove any impurities, and dried. The material was a mixture of analcite and mordenite (45 parts).

EXAMPLE V

The sodium silicate glass used in Example III (600 parts), a non-crystalline silicic compound (130 parts; $SiO_2$:60%, $H_2O$:38%), and water (770 parts) were charged to a horizontal rotary autoclave and were kept at 170° C. for 7 hours. Solid matter obtained from the autoclave was washed intimately with water at 70° C., and then dried. The material obtained was mordenite (40 parts).

EXAMPLE VI

A sodium silicate glass (600 parts), containing 0.3 weight percent of $Al_2O_3$ and having a $SiO_2/Na_2O$ molar ratio of 3.3, sodium aluminate (50 parts; $Al_2O_3$:25%), and water (1000 parts) were allowed to react using the same apparatus and the same condition as in Example V. Solid matter obtained was washed with aqueous 0.1 N HCl at room temperature with water, and then dried. The material obtained was a mixture of mordenite and analcite (80 parts).

EXAMPLE VII

The following example describes in greater detail the effect of water washing of the crude zeolite prepared using the process of this invention. Crude mordenite (1 kg.) obtained as in Example III, was added to 5 l. of water, boiled for 30 minutes with stirring, and then filtered. This procedure was repeated to give samples of mordenite having different frequencies of washing, i.e., samples having been washed with water once, twice, three times, four times, and five times. The amount of sodium eluted after each washing was then determined. A portion of each sample of mordenite having a different water frequency was then dried at 100–110° C. for 2 hours and then allowed to stand at room temperature for 24 hours. A second portion of each sample was dried at 100–110° C. for 2 hours, heated to 700° C. for 3 hours and then allowed to stand at room temperature for 24 hours. X-ray diffraction patterns were obtained on each of the samples prepared as above. The following table summarizes the results obtained on the amount of sodium eluted and the X-ray diffraction patterns obtained.

| Washing frequency: | Eluted sodium (wt. percent) | Crystalline structure ($h'/h$) |
|---|---|---|
| 0 | 5.3 | (¹) |
| 1 | 1.9 | (¹) |
| 2 | 0.6 | (¹) |
| 3 | 0.4 | 0.6 |
| 4 | 0.3 | 0.9 |
| 5 | 0.2 | 1.0 |

¹ Disintegrated mordenite crystal.

In the above table:

$h$ is the X-ray diffraction strength (d.=3.48 A.) obtained on each water-washed sample after drying at 100–110° C. for 2 hours and then allowing the sample to stand at room temperature for 24 hours (height determined from the background).

$h'$ is the X-ray diffraction strength (d.=3.48 A.) obtained on each water-washed sample after drying at 100–110° C. for 2 hours, heating the sample to 700° C. for 3 hours, and then allowing the sample to stand at room temperature for 24 hours (height determined from the background).

$h'/h$ is the ratio of the X-ray diffraction strengths obtained and is a measure of the crystal stability of the sample subjected to the 700° C. temperature in comparison with the sample subjected to the 100–110° C. temperature.

Disintegrated mordenite crystal indicates the complete disintegration of the crystal structure of mordenite, after heating to 700° C. for 3 hours.

EXAMPLE VIII

Two columns were connected with a conduit and equipped with a quantitative pump (cocks were attached to the conduit and an exhaust port respectively). Crude mordenite (100 g.) prepared as in Example III was charged to one side of the column, and an H-type cation exchange resin was charged to the other one. The crude mordenite in the one column was washed with 1 l. of warm water with the washings being drained through the exhaust port. Thereafter, aqueous 0.5 N HCl was introduced using the quantitative pump to circulate the solution in the system at a constant speed. After opening the cock, the liquor portion was drained, washed with warm water, the zeolite was removed, and then dried.

The product obtained was mordenite, containing no impurities and having a good stability to a high temperature.

EXAMPLE IX

Sodium silicate glass (300 parts) containing 1.3 weight percent of $Al_2O_3$, and having an $SiO_2/Na_2O$ molar ratio of 3.3, aluminum hydroxide (6 parts; synthetic gibbsite, $Al_2O_3$: 65%), and water (450 parts) were allowed to react as in Example III. The solid material obtained was separated. Water glass ($SiO_2$: 26.5%, $Na_2O$: 9.5%), having a $SiO_2/Na_2O$ molar ratio of 2.9 was washed with water and dried to obtain goood mordenite (55 parts). The particle size distribution of the mordenite was determined and the results are shown in the following table.

Particle size ($\mu$)—

| Retained on: | Weight percent |
|---|---|
| 350 | 0.1 |
| 250 | 0.1 |
| 170 | 0.1 |
| 125 | 0.4 |
| 88 | 30.3 |
| 62 | 47.6 |
| 44 | 8.8 |
| Passed thru: 44 | 12.6 |

EXAMPLE X

Synthetic mordenite prepared as in Example III was washed with water and dried at 110° C. The material was allowed to stand open at room temperature for 24 hours to prepare a sample for specific surface area determination. The specific surface area of the sample was measured using the BET method, and the result was 400 m.²/g.:$N_2$. The sample was treated repeatedly with aqueous 2 N HCl, and the sample was tested as above, to obtain 590 m.²/g.:$N_2$. Said mordenite was used to disproportionate toluene into benzene and xylenes and compared to the effect of a commercial H-type mordenite. The results are summarized in the following table:

LHSV=0.5; reaction temp., 400° C.

| Sample | Conversion (percent) | Yield (percent) | | | |
|---|---|---|---|---|---|
| | | Benzene | p-Xylene | m-Xylene | o-Xylene |
| Mordenite of Example III | 50.0 | 23.0 | 6.7 | 14.0 | 6.3 |
| Commercial mordenite | 44.4 | 21.6 | 5.4 | 12.0 | 5.4 |

What is claimed is:

1. A method for the production of mordenite which comprises:

(a) heating a mixture of a solid alkali metal silicate glass consisting essentially of $SiO_2$, $M_2O$ and $Al_2O_3$ and a sufficient amount of water to dissolve said solid alkali metal silicate glass at a temperature of from about 130 to 190° C. for a period of time of from 0.5 to 10 hours, wherein M is selected from the group consisting of sodium and potassium, wherein the molar ratio $SiO_2/M_2O$ ranges from about 2.5 to 4 and wherein said $Al_2O_3$ is present in said solid alkali metal silicate glass in an amount of from about 0.5 to 5% by weight, based on the weight of said $SiO_2$ and $M_2O$;

(b) separating the mordenite produced from step (a); and (c) purifying the mordenite from step (b).

References Cited

UNITED STATES PATENTS

| 2,882,244 | 4/1959 | Milton | 23—113 |
| 3,130,007 | 4/1964 | Breck | 23—113 |
| 3,436,174 | 4/1969 | Sand | 23—113 |

OTHER REFERENCES

Barrer et al.: J. Chem. Soc., 1952, pp. 1561–1571.

EDWARD J. MEROS, Primary Examiner

U.S. Cl. X.R.

423—328